Sept. 8, 1953 A. R. BLOOD 2,651,179
DUAL PRESSURE HYDRAULIC APPARATUS
Filed Sept. 9, 1950 5 Sheets-Sheet 1

Inventor
Arthur R. Blood
by James F. Coffee
Attorney

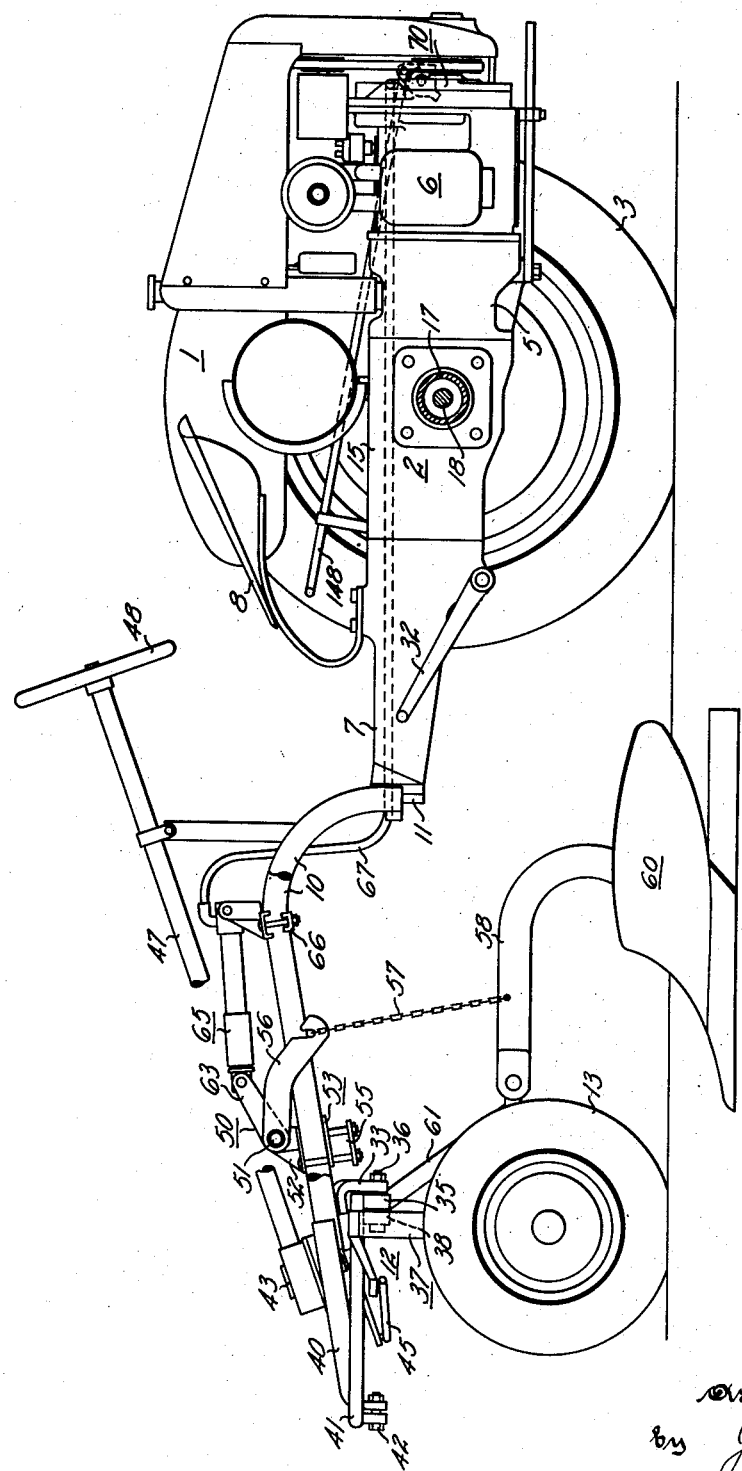

Sept. 8, 1953  A. R. BLOOD  2,651,179
DUAL PRESSURE HYDRAULIC APPARATUS
Filed Sept. 9, 1950  5 Sheets-Sheet 3
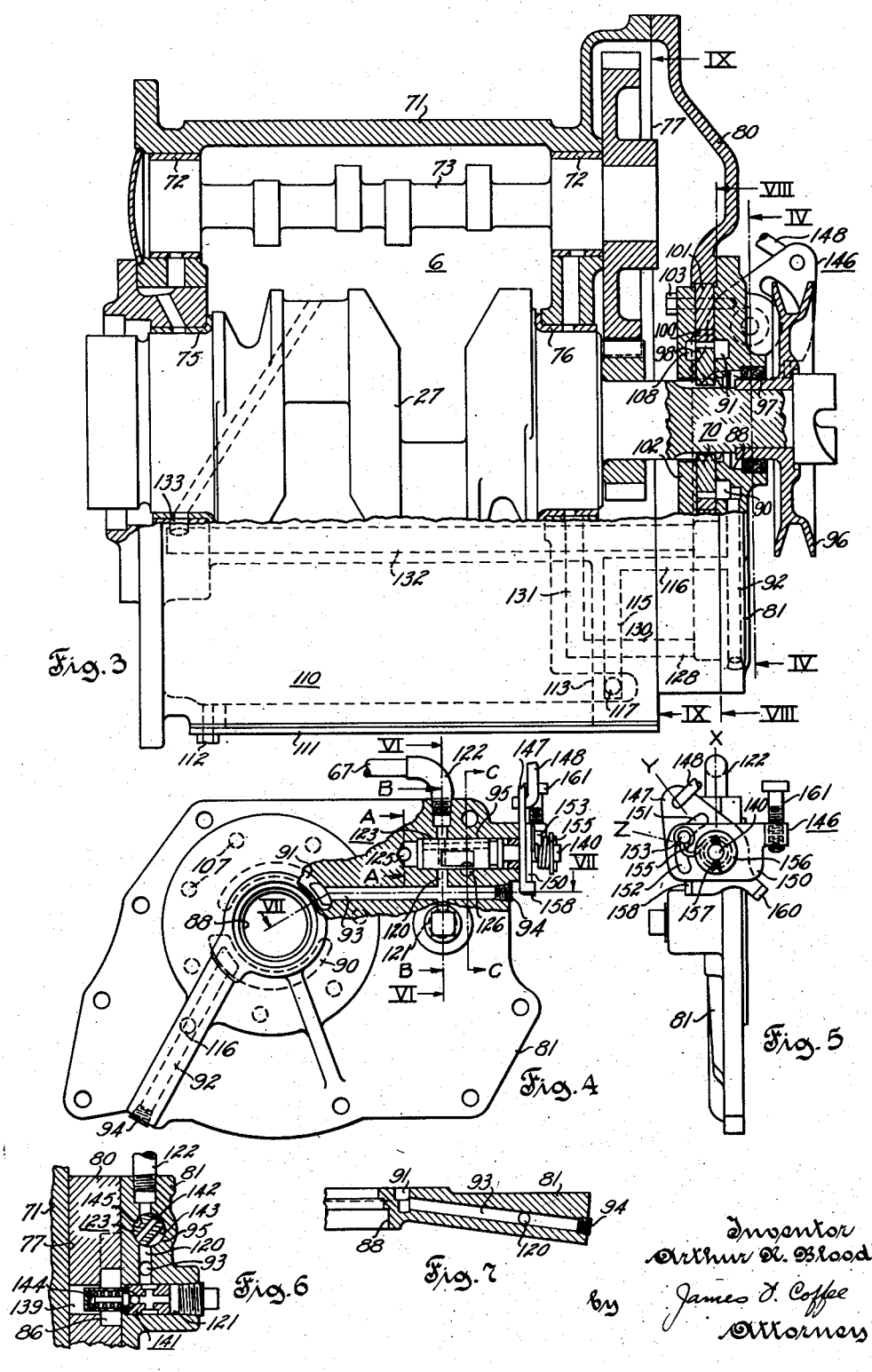

Inventor
Arthur R. Blood
by James D. Coffee
Attorney

Sept. 8, 1953         A. R. BLOOD         2,651,179
DUAL PRESSURE HYDRAULIC APPARATUS
Filed Sept. 9, 1950         5 Sheets-Sheet 5
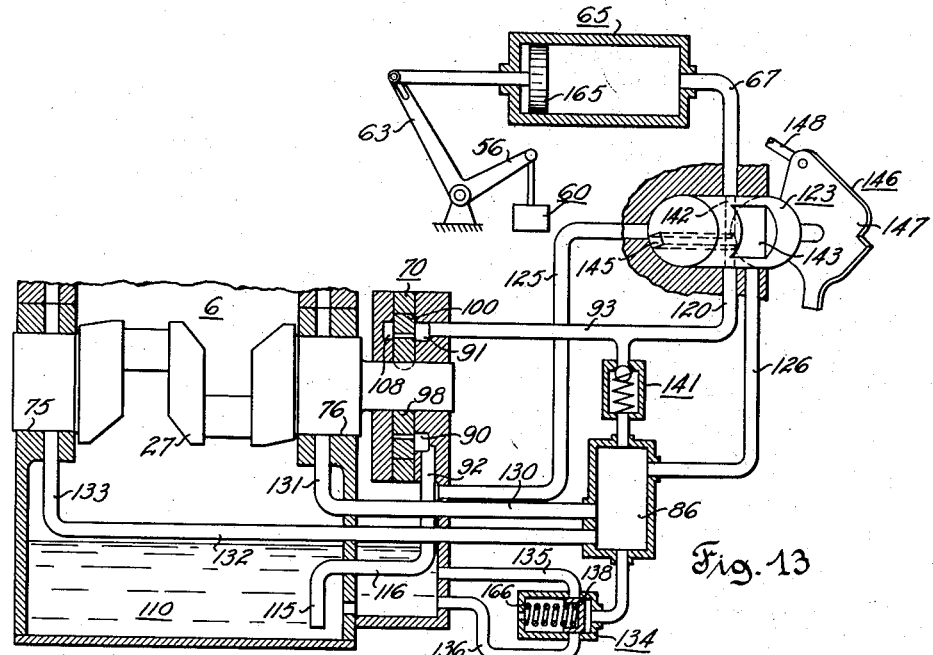
Fig. 13
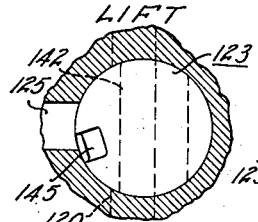 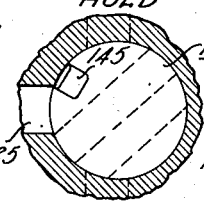 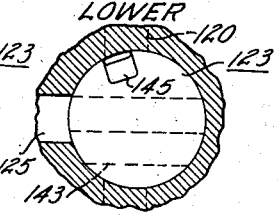
Fig. 14     Fig. 15     Fig. 16
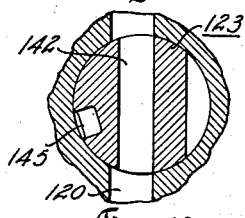 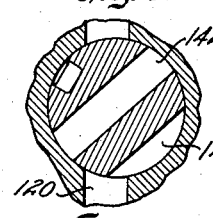 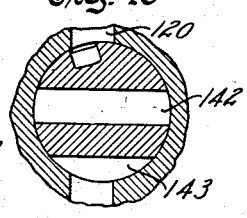
Fig. 17     Fig. 18     Fig. 19
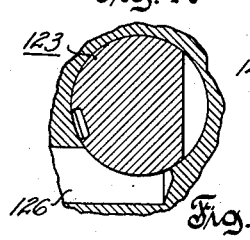 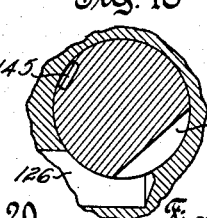 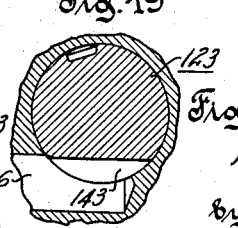
Fig. 20     Fig. 21     Fig. 22
Inventor
Arthur R. Blood
by James D. Coffee
Attorney Patented Sept. 8, 1953

2,651,179

UNITED STATES PATENT OFFICE 2,651,179

DUAL PRESSURE HYDRAULIC APPARATUS

Arthur R. Blood, Milwaukee, Wis., assignor to Allis-Chalmers Manufacturing Company, Milwaukee, Wis.

Application September 9, 1950, Serial No. 183,976

7 Claims. (Cl. 60—52)

This invention relates generally to hydraulic apparatus and is more particularly directed to a hydraulic system for use with an engine driven vehicle, hereinafter termed tractor, wherein a single source of pressure fluid is utilized to supply power to a hydraulic motor and, also, to lubricate the vehicle engine.

In tractors having hydraulic power lift apparatus it has been common practice heretofore to equip such tractors with a fluid pressure means which is used solely to operate the power lift, although the source of fluid for such means may also serve to lubricate the transmission or some other part of the tractor. And, where a fluid pressure means is also used to lubricate moving parts of the tractor engine, a second system is installed which is independent of the power lift fluid pressure means. As a result two different pumps and drive arrangements therefor must be installed on the tractor.

It is, therefore, a primary object of the present invention to provide hydraulic apparatus, for use with a tractor, utilizing a single source of fluid and having a single pumping means wherein fluid is supplied to a hydraulic motor at relatively high pressure and to engine lubricating means at a relatively low pressure.

Another object of this invention is to provide hydraulic apparatus including a single source of fluid pressure supplying both high and low pressure fluid wherein a single manual control means is operable to direct the flow of high pressure fluid without appreciably affecting the supply of fluid to the low pressure system.

A still further object is to provide a hydraulic system having a single source of fluid and a single pumping means providing high pressure and low pressure fluid, respectively, to first and second devices, and having a manually operable control means communicating with elements of both of said devices and operable to direct flow to and from the first device while permitting a practically continuous flow to the second device.

Another object of the present invention is to provide a hydraulic system having a single source of fluid and a single pumping means providing high and low pressure fluid, respectively, to first and second devices, a manually operable control means communicating with elements of both of said devices, and having pressure relief means coacting with said control means to afford a practically continuous flow of low pressure fluid without interfering with the availability of the high pressure fluid.

The construction and operation of apparatus embodying the invention will become more readily apparent as the disclosure progresses and particularly points out additional objects and advantages of special importance. And accordingly the present invention may be considered as comprising the various constructions, combinations and/or subcombinations of parts as hereinafter more fully set forth in the detailed description and appended claims, reference being had to the accompanying drawings, in which:

Fig. 2 is a side view of the tractor in Fig. 1 with parts broken away and the near driving wheel removed to more clearly show the engine and power lift;

Fig. 3 is an enlarged side view of the engine shown in Figs. 1 and 2 with parts broken away and in section to clarify the relationship of internal structure;

Fig. 4 is a view taken along line IV—IV of Fig. 3, reduced in scale;

Fig. 5 is a side view of Fig. 4;

Figure 10:
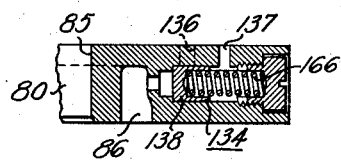
Figure 8:
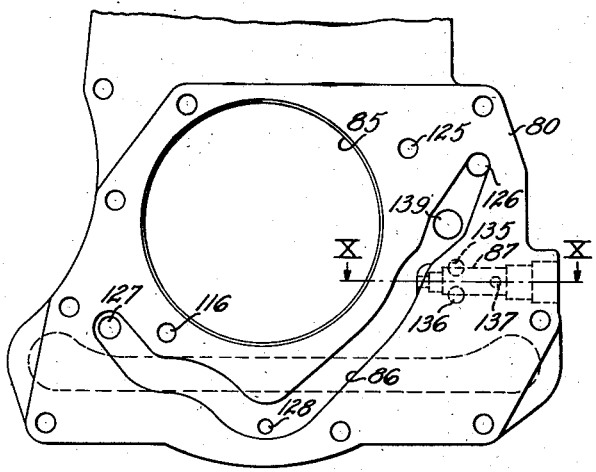
Figure 11:
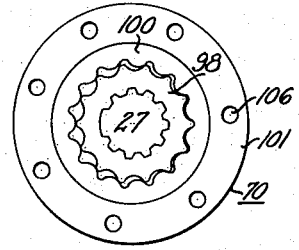
Figure 12:
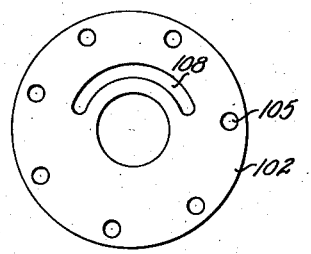
Figure 9:
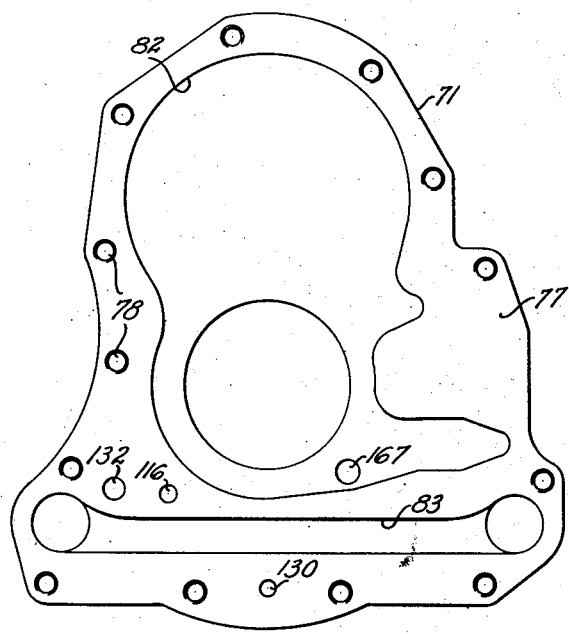

Fig. 6 is a section taken along line VI—VI in Fig. 4, with plate 81 shown in surface abutting relation to the outer face of plate 80, and the rear face 77 of engine block 71 positioned adjacent the inner surface of plate 80;

Fig. 7 is a section taken along line VII—VII in Fig. 4;

Fig. 8 is a view taken along line VIII—VIII in Fig. 3, reduced in scale;

Fig. 9 is a view taken along line IX—IX in Fig. 3, reduced in scale;

Fig. 10 is a section taken along line X—X in Fig. 8;

Fig. 11 is a reduced scale side view of the pump shown in section in Fig. 3;

Fig. 12 is a reduced scale side view of the pump backing plate shown in section in Fig. 3;

Fig. 13 is a schematic illustration of the hydraulic lift and lubrication system shown in the preceding figures;

Figs. 14–16 are enlarged sectional views taken along line A—A in Fig. 4, with the control valve in the various positions indicated;

Figs. 17–19 are enlarged sectional views taken along line B—B of Fig. 4 with the valve in lift, hold and lower positions, respectively; and Figs. 20–22 are enlarged sectional views taken along line C—C of Fig. 4 with the control valve in lift, hold and lower positions, respectively.

Figure 1:
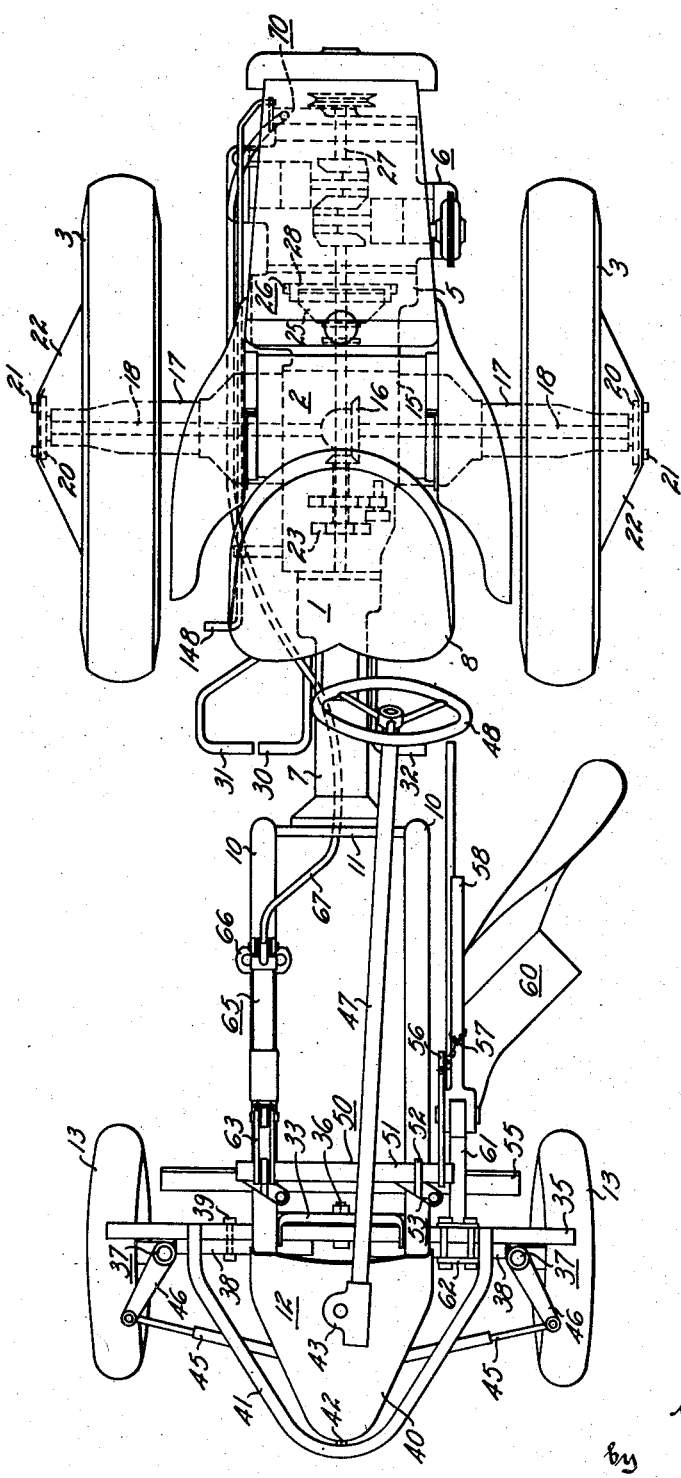
Fig. 1 is a plan view of a tractor incorporating apparatus embodying the present invention.

Referring particularly to Figs. 1 and 2 it will be seen that apparatus chosen to illustrate the present invention comprises generally a tractor 1 having a rear axle structure 2 with traction wheels 3 mounted at opposite ends thereof, a rearwardly projecting frame or housing part 5 mounting an engine 6, a forwardly extending frame part 7 mounting an operator's seat or station 8 in elevated relation thereto, a pair of upwardly arched frame members 10 having their rear ends rigidly united with a transverse part 11 which in turn is fixedly secured to the forward end of central frame part 7, and a transverse front axle structure 12 secured to forward end portions of frame members 10 and supported on a pair of laterally spaced dirigible front wheels 13.

Rear axle structure 2 includes an enlarged central portion 15 operatively enclosing a differential drive mechanism 16 and a pair of oppositely projecting axle shaft housings 17 each enclosing an axle shaft 18 having its inner end operatively connected with the differential mechanism. The outer or exposed end of each axle shaft terminates in a radially flanged hub portion 20 having fixed thereto, as by bolts 21, the central disk portion 22 of the driving wheel 3. The forwardly extending tubular frame part 7 encloses a change speed gearing 23 operatively connected with differential mechanism 16 and with the driven element 25 of a clutch 26 which is enclosed in the rearwardly projecting housing 5.

A two cylinder horizontal piston engine 6 is detachably bolted to the rear end of housing 5 and is thereby supported in rearwardly overhanging relation to central portion 15 of rear axle structure 2, and the adjacent end of the engine crankshaft 27 entering housing 5 has mounted thereon the driving element 28 of clutch 26. Suitable means for controlling the driving unit, including brake pedals 30 and 31 and clutch pedal 32, are provided within easy reach of an operator seated at station 8.

The front axle structure 12 comprises a rigid transverse brace member 33 extending between forward end portions of frame members 10 with its opposite ends suitably secured in fixed bracing relation to said frame members, and a relatively long bar 35 pivotally connected at its midpoint to the center of brace member 33, as by a bolt 36, with opposite end portions thereof projecting laterally beyond frame members 10. Wheel mounting axle assemblies 37 each include a transverse bar member 38 detachably secured to bar 35, as by bolts 39, for selective adjustment longitudinally thereof to vary the tread spacing of the front wheels.

The forward end portions of frame members 10 are additionally braced by a rigid generally triangular shaped plate member 40 having edge portions thereof suitably fixed, as by welding, to frame members 10. Transverse bar 35 is also braced by a curved rod 41 having its midportion swivel connected with the apex portion of plate member 40, as by bolt 42, and having opposite end portions fixedly connected, as by welding, with the top edge of the outer portions of bar 35.

Plate member 40 mounts a steering gear unit 43 operatively connected to the front wheels through suitable means including telescopically adjustable links 45 and arms 46 and operable through a steering column 47 and steering wheel 48 disposed within easy reach of an operator seated at station 8.

An implement lift mechanism 50 is disposed rearwardly of front axle structure 12 in supported relation to frame members 10. More specifically, a rock shaft 51, disposed transversely with respect to the longitudinal axis of the tractor, is rotatably supported adjacent each end thereof in a suitable bearing means, such as that afforded by the upstanding bracket 52 of a clamping device 53 detachably secured to frame members 10. The lower portion of clamps 53 support a transverse bar 55 affording means for supportingly mounting tools (not shown) on the tractor. As shown in Figs. 1 and 2, the near side of rock shaft 51 has a lift arm 56 nonrotatably fixed thereto in rearwardly extending relation with means, such as chain 57, fixed to the free end thereof affording connection with the underlying beam 58 of a plow 60. Plow beam 58 is pivotally connected at its forward end to a drawbar structure 61 which in turn is suitably attached, as by clamping structure 62, to the tractor front axle structure 12.

The far end of rock shaft 51, that is the end remote from lift arm 56, has a rock arm 63 nonrotatably fixed thereto in rearwardly extending relation with the free end thereof pivotally connected to a single acting hydraulic ram 65 for actuation thereby. As illustrated, ram 65 is pivotally, detachably secured to the underlying frame member 10, by clamping means 66, and receives fluid through a hose 67 from an engine driven pump 70.

Looking now at Fig. 3 it will be seen that the engine chosen to illustrate the present invention comprises a main housing or block 71 with a first pair of aligned openings (not shown) through opposite end portions thereof supporting bearing structures 72 rotatably mounting a cam shaft 73 therein, and a second pair of aligned openings (also not shown) receiving bearing structures 75 and 76 rotatably supporting opposite ends of crankshaft 27. The major portion of the details of the horizontal piston type engine are not shown since such details are believed unnecessary for a complete understanding of the present invention and their presence in the drawings would only render it more difficult to visualize and understand the subject invention.

The rear or right hand end portion of the engine, as viewed in Fig. 3, is made up of separable elements affording a housing for the pump structure 70 which is the subject of the present invention. More particularly, the rear face 77 of block 71 has a series of bolt receiving openings 78 (Fig. 9) along the outer edge portion thereof affording means whereby complementary plate structures 80 (see also Fig. 8) and 81 (see also Fig. 4) may be attached in covering relation to the end of the engine block, as by bolts or the like not shown. As seen in Fig. 9, the rear face 77 of the engine block has a recessed portion 82 extending over nearly the entire surface thereof and a narrow elongated recessed portion 83 at the bottom portion of the face. Recess 83 is a portion of the manifold for engine cooling liquid and, since it comprises no part of this invention, a further explanation thereof is believed unnecessary. Plate structure 80 is detachably mounted in covering relation to face 77 and includes (see Fig. 8) a circular opening 85, an irregularly shaped elongated recess 86 and a valve housing 87 communicating with recess 86. Plate structure 81 is detachably mounted in covering relation to the lower portion of plate 80 and includes a circular opening 88 therethrough (Fig. 4), a pair of arcuately shaped recesses 90 and 91 on the inner surface of the plate adjacent opening 88, a bore 92 placing lower recess 90 in communication with an opening in the lower edge of plate 81, a second bore 93 placing upper recess 91 in communication with an opening in the side edge of plate 81 (see also Fig. 7), and a cylindrical valve housing 95 disposed in overlying parallel relation to bore 93. Plugs 94 are positioned in the outer ends of bores 92 and 93 after the latter have been formed in plate 81.

Crankshaft 27 extends rearwardly through plates 80 and 81 and a pulley 96 for driving a fan (not shown) is nonrotatably mounted on the outer end thereof. Intermediate main bearing 76 and an oil seal 97 disposed in opening 88 of plate 81, crankshaft 27 is splined to drivingly receive element 98 of pump 70 in fixed relation thereto. And in this connection it may be noted that pump 70 is of a conventional rotary type having cooperating internal and external rotors 99 and 100, respectively, disposed in coplanar relation with a supporting ring 101 encircling the external rotor (see Fig. 11). Supporting ring 101 is in turn secured in position in plate 80 between a backing plate 102 (Figs. 3 and 12) and cover plate 81 by suitable means such as bolts 103 extending through aligned openings 105, 106, and 107 in plate 102, ring 101 and cover plate 81, respectively. Backing plate 102 includes an arcuate recess 108 adapted to be positioned opposite arcuate recess 91 in cover plate 81 to equalize the pressure on the rotors at the discharge side of the pump. The action of rotors 99 and 100, upon operation of engine 6, pumps lubricant from sump 110 through passages 115, 116 and 92 into arcuate recess 90 from which it is discharged under increased pressure in arcuate recess 91 into supply passage 93. Such a pump mechanism is described in the Hill Patent No. 1,682,563, issued August 28, 1928, to which attention is directed for a more complete description.

Having described the pump proper and its relation to the engine crankshaft, a detailed description will now be given of the flow of oil from a main source to the pump and thence to the engine and hydraulic lift means.

The lower portion of engine block 71 comprises a hollow lubricant confining housing or sump 110 having a removable cover 111 forming the bottom thereof and being detachably secured to the engine block as by cap screws 112 or the like. An inwardly projecting boss 113 in the block at the rear end (right hand end in Fig. 3) of sump 110 has a vertical passage 115 formed therein communicating with the sump or reservoir 110 through an opening 117 at the lower end of the passage. The upper end of passage 115 intersects a horizontal passage 116 leading through plate 80 into plate structure 81 where it intersects vertical passage 92 communicating with arcuate recess 90 on the intake side of the pump 70.

Looking particularly at Fig. 4, the arcuate recess 91 on the upper or discharge side of the pump rotors communicates with horizontal supply passage 93 which intersects a vertical passage 120 (Fig. 6) extending between a valve chamber 121 and a connector 122 for coupling a hose 67 or the like thereto to conduct fluid to ram 65 (Fig. 2). The upper portion of passage 120 is intersected by a valve chamber 95 having a cylindrical valve 123 therein for controlling the flow of fluid to and from the ram. Valve chamber 95 also communicates with a transverse passage 125 extending through plate 80 and opening into recess 82 of the adjacent rear end portion of block 71 from which it flows through a passage 167 at the lower end of the block into sump 110. A second transverse passage 126 places valve chamber 95 in communication with the oil gallery or recess 86 (Fig. 8) in plate 80. This irregularly shaped recess or gallery 86 communicates with main bearings 75 and 76 of engine crankshaft 27 through transverse openings 127 and 128, respectively. Opening 128 communicates with a horizontal passage 130 (Fig. 3) in the end of the engine block which intersects a vertical passage 131 leading to main bearing 76. Opening 127 communicates with a horizontal passage 132 extending the length of the side wall of the engine and having communication with a vertical passage 133 leading to main bearing 75. Also communicating with gallery 86 is a lateral passage or chamber 87, containing a spring biased piston type relief valve 134, affording communication between gallery 86 and recess portion 82 of face 77 of the engine block through passages 135 and 136 upon attainment of a predetermined pressure in gallery 86. A breather hole 137 at the rear of the piston 138 of the pressure relief valve (see also Fig. 10) prevents fluid pressure from building up behind the piston and also affords communication via recess 82 and passage 167 with the crankcase 110.

And, referring to Figs. 4 and 6, the lower end of passage 120 intersects a transverse chamber forming valve housing 121 which extends into gallery 86 and bore 139 in plate 80 and includes therein a ball check relief valve 141 controlling communication between passage 120 and gallery 86. Bore 139 is provided to accommodate the inwardly projecting end portion of the spring biasing means 144 of valve 141 and this bore terminates at the inner edge of plate 80 with the abutting surface of block face 77 providing a cover therefor.

Valve chamber 95 houses control valve 123 which is a rotatable cylindrical valve having a reduced end portion 140 thereof projecting outwardly from one edge of plate structure 81 and affording means for manual operation of the valve in a manner to be described later. The cylindrical portion of the valve includes a transverse bore 142 (Fig. 6) therethrough, which is positionable to place the upper and lower portions of discharge passage 120 in communication with each other, a flat side portion 143 positionable to place the lower portion of passage 120 in communication with by-pass passage 126, and a milled slot 145 inclined longitudinally of the valve (see Figs. 14–16) and positionable to place the upper portion of passage 120, and thereby ram 65, in communication with return passage 125.

The manually operable valve control mechanism 146 comprises a lever arm 147 nonrotatably fixed to the projecting shaft portion 140 of control valve 123, a valve actuating rod 148 pivotally secured at one end to the free end of arm 147 and having its other end positioned within easy reach of an operator seated at station 8 (Fig. 2), and a plate 150 rotatably mounted on the projecting end portion 140 of valve 123 in surface abutting relation to lever arm 147. Lever arm 147 and plate 150 have arcuate slots (Fig. 5) 151 and 152, respectively, of equal radii formed therein which slots are laterally alignable for movement relative to a stud 153 secured to plate structure 81. A compression coil spring 155 is positioned on the outer end of shaft 140 with one end thereof engaging stud 153 and the opposite end fixed in a suitable manner to shaft 140. A washer 156 and pin 157 prevent displacement of the spring relative to shaft 140 and afford means for causing spring 155 to exert pressure on plate 150 thereby maintaining the latter in surface bearing relation with arm 147. Lever arm 147 also includes two relatively small portions thereof, 158 and 160, which project outwardly toward plate 150. Projection 158 is adapted to engage the lower edge of plate 150 (Fig. 5) and projection 160 is movable upon rotation of arm 147 into abutting engagement with a screw 161 adjustably held by plate 150.

Referring particularly to Fig. 13 which is a schematic illustration of the structure just described, an account of the operation of the hydraulic lift and engine lubrication system will now be given. Operation of engine 6 to rotate crankshaft 27 causes a rotary movement of rotors 98 and 100 to thereby draw lubricating fluid from sump 110 through passages 115, 116, 92 into the pump inlet represented by the arcuate recess 90, and to discharge it under pressure through arcuate recess or pressure fluid outlet 91 of pump 70 into supply passage 93. And in this connection it should be noted that any suitable pumping means, such as a gear type pump, might be employed in place of the rotor pump illustrated as structural features of the latter form no part of the present invention.

Control valve 123 is connected in pressure fluid receiving relation with supply passage 93 and selectively operable to connect supply passage 93 either with a first passage means, including passage 67, in communication with first device 65, or with a second passage means in communication with a second device represented by the engine lubricating system. The second passage means include passages 126, 130, 132 and manifold 86; and relief valve 134 limits pressure buildup in the second passage means while the second passage means is connected by valve 123 in pressure fluid receiving relation with supply passage 93. Relief valve 134 is adapted to bypass fluid from the second passage means to the sump or fluid source 110 at a pressure considerably lower than the pressure which pump 70 is adapted to build up in the ram or first device 65 upon connection of first passage 67 with supply passage 93 by valve 123.

With control valve 123 in its lift position (Figs. 13, 14, 17 and 20), lever 147 being positioned along line X (Fig. 5), all of the fluid in discharge passage 93 flows through passage 120, bore 142, connector 122 and hose 67 into ram 65. Movement of the piston 165 in the ram effects a forward movement of rock arm 63 and thereby moves lift arm 56 to a raised position with respect to the ground. Upon completion of the stroke of piston 165 toward the left end of the ram as viewed in Fig. 13, pressure in discharge passage 93 is increased due to the absence of an outlet for the fluid until it exceeds a predetermined pressure sufficient to unseat the check valve in pressure relief means 141 whereupon the discharged fluid, in excess of that sufficient to maintain the ram piston 165 in its extended position, flows via chamber 121 (Fig. 6) into gallery 86. From gallery 86 the fluid flows through opening 127 and passages 132 and 133 to main bearing 75 at the left end of the engine crankshaft, and also through opening 128 and passages 130 and 131 to main bearing 76 at the right end of crankshaft 27. After the oil thus delivered to the main bearings has traveled to the camshaft bearings and other parts of the engine requiring lubrication (not shown) it is returned to sump 110. And, in order that the pressure of the lubricating fluid delivered to the engine may be controlled, a pressure relief means 134 is placed in passage 87 communicating with gallery 86 and the oil reservoir 110. Consequently, when the pressure in gallery 86 exceeds the desired amount for properly lubricating the engine, piston 138 (Fig. 10) in relief means 134 moves against the pressure of the spring 166 and allows oil to flow through passages 135 and 136 to the reservoir.

It should be noted at this point that the control lever arrangement in the illustrated embodiment of the present invention is such that the hand control or rod 148 for actuating lever 147 must be held in the lift position as long as it is desired to deliver fluid to the ram. In moving lever 147 from the "hold" position into "lift" position (from line Y to line X, Fig. 5) projection 158 thereon engages the lower edge of plate 150 and moves the latter in a clockwise direction along with the lever. This movement winds coil spring 155 about its supporting shaft 140 thereby biasing shaft 140 and lever 147 to urge them in a counterclockwise direction. Consequently, when lever 147 is released from the control of the operator, while in its lift position, spring 155 forces the lever back to its "hold" position along line Y wherein the upper end of slot 152 engages pin 153. Further downward movement of lever arm 147 is relative to plate 150.

Should it be desirable to maintain ram piston 165 in its extended position with the implement raised, lever 147 may be released to move to the "hold" position as described above, wherein bore 142 is moved away from alignment with passage 120 (see also Fig. 18) and fluid is trapped in the ram cylinder. With the valve thus positioned the flat side portion 143 of control valve 123 is disposed to place the lower portion of passage 120 in communication with opening 126 (Fig. 21) and thereby direct all the discharge fluid to oil gallery 86 from whence it flows through openings 127 and 128 to the engine parts and through valve 134 to the sump as described above.

To effect a return of the fluid in ram 65 to the source and thereby lower implement 60, control lever 147 is moved still farther in a counterclockwise direction with the longitudinal axis of lever 147 lying generally along line Z (Fig. 5). In this position slot 145 affords communication between the upper portion of passage 120 and passage 125 (Fig. 16) whereupon the oil in the ram may flow through passage 125 into relieved portion 82 of engine block face 77 and then through opening 167 (Fig. 9) back to sump 110. Also, pressure fluid being discharged by pump 70 into the lower portion of passage 120 flows along the flat portion 143 of valve 123 through opening 126 into oil gallery 86 and thence to the engine parts and lubricant source as previously described.

Thus it is seen from the foregoing that lubricant is flowing to the engine parts at all times during operation other than the brief interval when the full discharge of pump 70 is required to move ram piston 165 to its extended or lift position. In any commercially practical lift apparatus this time of extension of the ram piston is so brief, usually a few seconds, that the interruption in flow of oil to the engine during such interval will be negligible.

Also, it may be noted in Fig. 5 that movement of lever 147 to its "lower" position along line Z is limited by engagement of the upper end of slot 151 with stud 153 and when such engagement is complete groove 145 in control valve 123 is in full communication with the upper portion of passage 120 to permit a maximum rate of return of fluid from ram. However, should it be desired to slow the rate of return of fluid from the ram a throttling effect can be achieved by moving adjusting screw 161 downward relative to plate 150 so that projection 160 on lever 147 engages the bottom of screw 161 before the upper end of slot 151 has a chance to strike stud 153. Thus the width of inclined slot 145 which may be placed in communication with passage 120 is reduced and the return flow of fluid from the ram is retarded accordingly.

From the foregoing description it is seen that apparatus constructed in accordance with the present invention affords means for supplying fluid from a single pressure source to a plurality of devices at different pressures. More particularly, there is illustrated means for supplying oil from a single pumping device to an engine for lubrication of parts thereof at relatively low pressure and, also, to a hydraulic ram at a relatively high pressure for lifting implements and the like. Furthermore, the supply of low pressure fluid to the engine is not appreciably affected by the delivery of high pressure fluid to the hydraulic ram.

From a general point of view, it will be noted that the control valve 123 is selectively adjustable to a first or lift position in which a first and a second housing port of said valve communicate with each other while communication between said first and a third housing port and between said second and a fourth housing port of said valve is prevented. In the illustrated embodiment of the invention, the mentioned first housing port is afforded by the part of the passage 120 which extends downwardly from the bore 95, in Fig. 4, and the second port is afforded by the part of the passage 120 which extends upwardly from the bore 95. The third housing port is afforded, in the illustrated embodiment of the invention, by the bore 126 which communicates with the bore 95, and the fourth housing port is afforded by the bore 125, all as shown in Fig. 4 and as schematically indicated in Fig. 13. It will further be noted that the control valve 123 is adjustable to a second or hold position in which the mentioned first and third ports communicate with each other while communication between the first and second ports and between the second and fourth ports is prevented. The valve 123 is further adjustable to a third or lowering position which affords communication between said second and fourth ports and between said first and third ports while communication between said first and second ports is prevented. A check valve controlled connection between the manifold or fluid chamber 86 and the reservoir or source of fluid 110 is represented by the passage including the second relief valve 134.

Although shown and described in connection with an engine lubricating system and an implement lift means, it is not intended to thereby limit the present invention. Other applications within the scope of the appended claims may become readily apparent to those skilled in the art whenever it is desired to operate a plurality of fluid operated motors and/or devices at different pressures.

It is claimed and desired to secure by Letters Patent:

1. Hydraulic apparatus for supplying high pressure fluid and low pressure fluid, respectively, to a hydraulic motor and to an engine lubricating system, said apparatus comprising, a source of fluid, a pump having an inlet and a pressure fluid outlet, a passage placing said pump inlet in communication with said source, a first passage means placing said hydraulic motor into pressure fluid receiving relation with said pump outlet and into fluid delivering relation with said source, a control valve means operatively associated with said first passage means and selectively operable to place said hydraulic motor either into fluid pressure receiving communication with said pump outlet or into fluid delivering relation with said source, a fluid chamber having communication with said engine lubricating system, a second passage means placing said fluid chamber in communication with said source and connecting a portion of said first passage means intermediate said pump outlet and said control valve means in pressure fluid delivering relation with said fluid chamber, a third passage means placing said control valve means in communication with said fluid chamber, said control valve being constructed so that the discharge fluid from said pump outlet flows into said third passage whenever it is not being directed to said hydraulic motor, a first pressure relief valve operatively associated with said second passage means and responsive to the pressure fluid discharged from said pump so as to control the flow of fluid to said fluid chamber, and a second pressure relief valve operatively associated with a portion of said second passage means in downstream relation to said first pressure relief valve and operative to control the flow of fluid from said fluid chamber to said source.

2. In combination with an engine and a hydraulic motor, a hydraulic system comprising a fluid reservoir, a pump having an inlet and a pressure fluid outlet, a passage connecting said pump inlet in fluid receiving relation with said reservoir, a control valve selectively adjustable to a first position in which a first and a second housing port of said valve communicate with each other while communication between said first and a third housing port and between said second and a fourth housing port of said valve is prevented; and to a second position in which said first and third ports communicate with each other, while communication between said first and second ports and between said second and fourth ports is prevented; and to a third position affording communication between said second and fourth ports, and between said first and third ports, while communication between said first and second ports is prevented; a passageway connecting said pump outlet with said first port of said control valve, a manifold having a port in fluid communication with said third port of said valve, a check valve controlled connection between said passageway and said manifold, operative to admit pressure fluid from said passageway to said manifold, fluid conduit means connecting said manifold in fluid delivering relation with bearing means of said engine, fluid conduit means connecting said second port of said valve with said hydraulic motor, and fluid conduit means connecting said fourth port of said valve with said fluid reservoir.

3. The combination as set forth in claim 2, and further comprising a check valve controlled connection between said manifold and said fluid reservoir, operative to admit pressure fluid from said manifold to said reservoir.

4. Hydraulic apparatus for supplying high and low pressure fluid, respectively, to first and second devices comprising, a source of fluid, a pump having an inlet and a pressure fluid outlet, a passage placing said pump inlet in communication with said source, a supply passage in pressure fluid receiving relation with said pump outlet, control valve means connected in pressure fluid receiving relation with said supply passage and selectively operable to connect said supply passage either with a first passage means in communication with said first device or with a second passage means in communication with said second device, and means for limiting pressure build-up in said second passage means while said second passage means is connected by said valve means in pressure fluid receiving relation with said supply passage, said pressure limiting means including a relief valve adapted to bypass fluid from said second passage means to said source at a pressure considerably lower than the pressure which said pump is adapted to build up in said first device upon connection of said first passage means with said supply passage by said valve means.

5. The combination as set forth in claim 4 and further comprising additional means for limiting pressure build-up in said first device while said first passage means is connected by said valve means in pressure fluid receiving relation with said supply passage.

6. The combination as set forth in claim 5 in which said means for limiting pressure build-up in said first device comprises a relief valve adapted to bypass fluid from said supply passage into said second passage means upon attainment of a pressure in said first passage means considerably higher than the limit pressure attainable in said second passage means.

7. Hydraulic apparatus for supplying high and low pressure fluid, respectively, to a hydraulic motor and to an engine lubricating system, said apparatus comprising a source of fluid, a pump having an inlet and a pressure fluid outlet, a passage placing said pump inlet in communication with said source, a supply passage in pressure fluid receiving relation with said pump outlet, a fluid chamber in fluid delivering relation with said lubricating system, control valve means connected in pressure fluid receiving relation with said supply passage and selectively operable to connect said supply passage either with a first passage means in communication with said hydraulic motor or with a second passage means in communication with said fluid chamber, and means for limiting pressure build-up in said fluid chamber while said second passage means is connected by said valve means in pressure fluid receiving relation with said supply passage, said pressure limiting means including a relief valve adapted to bypass fluid from said fluid chamber to said source at a pressure considerably lower than the pressure which said pump is adapted to build up in said hydraulic motor upon connection of said first passage means with said supply passage by said valve means.

ARTHUR R. BLOOD.

References Cited in the file of this patent

UNITED STATES PATENTS

| Number | Name | Date |
|---|---|---|
| 1,613,753 | Hodgkinson | Jan. 11, 1927 |
| 1,912,184 | Ferris et al. | May 30, 1933 |
| 2,124,395 | Coughey | July 19, 1938 |
| 2,138,969 | Hobbs | Dec. 6, 1938 |
| 2,232,620 | Meeks | Feb. 14, 1941 |
| 2,482,249 | Court | Sept. 20, 1949 |